United States Patent
Krasadakis

(10) Patent No.: US 10,235,367 B2
(45) Date of Patent: Mar. 19, 2019

(54) ORGANIZATION, RETRIEVAL, ANNOTATION AND PRESENTATION OF MEDIA DATA FILES USING SIGNALS CAPTURED FROM A VIEWING ENVIRONMENT

(71) Applicant: Microsoft Technology Licensing, LLC, Redmond, WA (US)

(72) Inventor: Georgios Krasadakis, Dublin (IE)

(73) Assignee: Microsoft Technology Licensing, LLC, Redmond, WA (US)

( * ) Notice: Subject to any disclaimer, the term of this patent is extended or adjusted under 35 U.S.C. 154(b) by 470 days.

(21) Appl. No.: 14/993,035

(22) Filed: Jan. 11, 2016

(65) Prior Publication Data
US 2017/0199872 A1  Jul. 13, 2017

(51) Int. Cl.
*G06F 17/30* (2006.01)

(52) U.S. Cl.
CPC .. *G06F 17/30038* (2013.01); *G06F 17/30023* (2013.01); *G06F 17/30289* (2013.01); *G06F 17/30498* (2013.01); *G06F 17/30525* (2013.01); *G06F 17/3082* (2013.01); *G06F 17/30817* (2013.01)

(58) Field of Classification Search
USPC .............. 707/E17.009, E17.001, E17.044
See application file for complete search history.

(56) References Cited

U.S. PATENT DOCUMENTS

| 8,285,810 | B2 | 10/2012 | Svendsen et al. |
| 8,700,604 | B2 | 4/2014 | Roseman et al. |
| 8,725,739 | B2 | 5/2014 | Liang et al. |
| 2003/0024975 | A1 | 2/2003 | Rajasekharan |
| 2004/0205515 | A1* | 10/2004 | Socolow ............. G06F 17/24 715/202 |
| 2007/0011007 | A1* | 1/2007 | Greene ............... G11B 19/02 704/246 |
| 2007/0237136 | A1* | 10/2007 | Sako ............... G06F 17/30044 370/368 |
| 2011/0022394 | A1 | 1/2011 | Wide |

(Continued)

OTHER PUBLICATIONS

Zhao, et al., "Video Classification and Recommendation based on Affective Analysis of Viewers", In Journal of Neurocomputing, vol. 119, Nov. 2013, pp. 101-110.
Zarka, et al., "Contextual Trace-Based Video Recommendations", In Proceedings of 21st International Conference on World Wide Web, Apr. 16, 2012, pp. 751-754.

(Continued)

*Primary Examiner* — Jau Shya Meng

(57) ABSTRACT

A computer system automatically organizes, retrieves, annotates and/or presents media data files as collections of media data files associated with one or more entities using context captured in real time from a viewing environment. The computer system presents media data from selected media data files on presentation devices in the viewing environment and receives and processes signals from sensors in that viewing environment. The processed signals provide context, which can be used to select and retrieve media data files, and which can be used to further annotate the media data files and/or other data structures representing collections of media data files and/or entities. The computer system can be configured to be continually processing signals from sensors in the viewing environment to continuously identify and use the context from the viewing environment.

20 Claims, 7 Drawing Sheets

(56) References Cited

U.S. PATENT DOCUMENTS

| | | | |
|---|---|---|---|
| 2011/0276863 A1* | 11/2011 | Bhise | G06F 17/30905 715/201 |
| 2012/0210203 A1* | 8/2012 | Kandekar | G06F 17/30719 715/230 |
| 2012/0310642 A1 | 12/2012 | Cao et al. | |
| 2013/0145385 A1 | 6/2013 | Aghajanyan et al. | |
| 2013/0346068 A1 | 12/2013 | Solem et al. | |
| 2014/0006308 A1* | 1/2014 | Baggott | G06Q 30/0201 705/347 |
| 2014/0372910 A1* | 12/2014 | Alford Mandzic | H04L 67/10 715/753 |
| 2015/0019203 A1 | 1/2015 | Smith et al. | |
| 2015/0050010 A1 | 2/2015 | Lakhani et al. | |
| 2015/0100987 A1 | 4/2015 | Whitman et al. | |

OTHER PUBLICATIONS

Zhao, et al., "Personalized Video Recommendation Based on Viewing History with the Study on YouTube", In Proceedings of 4th International Conference on Internet Multimedia Computing and Service, Sep. 9, 2012, pp. 161-165.

Mei, et al., "Contextual Video Recommendation by Multimodal Relevance and User Feedback", In Journal of ACM Transactions on Information Systems, vol. 29, No. 2, Apr. 2011, 24 pages.

Arora, Dushyant, "A Social Video Recommendation System on YouTube", Published on: Jul. 14, 2015 Available at: http://citeseerx.ist.psu.edu/viewdoc/download?doi=10.1.1.353.1958&rep=rep1&type=pdf.

"International Search Report and Written Opinion Issued in PCT Application No. PCT/US2016/069059", dated Apr. 6, 2017, 10 Pages.

* cited by examiner

ORGANIZATION, RETRIEVAL, ANNOTATION AND PRESENTATION OF MEDIA DATA FILES USING SIGNALS CAPTURED FROM A VIEWING ENVIRONMENT

BACKGROUND

Individuals, as well as families and other groups of individuals, are increasingly generating and storing large collections of media data files, such as data files of media data including but not limited to photos, videos and audio and related rich media data, in digital form. These media data files are captured using multiple computer devices and are stored in multiple computer storage systems, including but not limited to non-removable storage devices in computers, removable storage devices, online storage systems accessible by computers over computer networks, and online services, such as social media accounts. Such media data are also being transmitted and shared among individuals through multiple transmission and distribution channels. The large volume of media data, and distribution of media data files among multiple different storage systems, and multiple transmission and distribution channels, can make overall management, administration, retrieval and use of media data files both difficult and time consuming for individuals or groups of individuals. While some systems can index large volumes of media data, such systems generally are limited to processing the media data itself or to responding to explicit user instructions so as to generate metadata about the media data or about the media data files. As a result, management, administration, retrieval and use of such media data files also is limited generally to the metadata available for the media data and the media data files.

SUMMARY

This Summary is provided to introduce a selection of concepts in a simplified form that are further described below in the Detailed Description. This Summary is intended neither to identify key or essential features, nor to limit the scope, of the claimed subject matter.

A computer system automatically organizes, retrieves, annotates and/or presents media data files as collections of media data files associated with one or more entities, such as individuals, groups of individuals or other objects, using context derived from signals captured in real time from a viewing environment. Media data files are data files of media data including but not limited to photos, videos and audio and related rich media data, including combinations of these, in digital form. The computer system presents media data from selected media data files on presentation devices in the viewing environment and receives and processes signals from sensors in that viewing environment. The processed signals provide context, which can be used to select and retrieve media data files, and can be used to further annotate the media data files and/or other data structures representing collections of media data files and/or entities. The context is any information derived by processing the signals from the sensors in the viewing environment. This information can have one or more associated times or time frames of reference, which allows the context to be correlated in time with media data being presented in the viewing environment. In some implementations, the computer system can be configured to be continually processing signals from sensors in the viewing environment to continuously identify and use the context from the viewing environment. The continuously identified context can be used to further retrieve and present media files related to that context, and to continuously annotate the media data files and/or other data structures representing collections of media data files and/or entities.

The context can include, for example, information extracted from an audio signal from a microphone in the viewing environment, using speech recognition and natural language processing and other techniques. The audio signal can include, for example, discussions among individuals within the viewing environment. The information extracted from such an audio signal can include, for example but not limited to, keywords, phrases, descriptions, references to entities, text, identities of individuals present in the viewing environment, time information, location information, occasion information, other entity information, emotion information and sentiment information.

As another example, context can include information extracted from an image signal from a camera in the viewing environment, using facial recognition, gesture recognition, facial expression recognition, gaze analysis and other image processing techniques. Such image data can be processed to identify, for example, individuals in the viewing environment, as well as their gestures and expressions, and reactions to, such as interest in, the presented media data.

Using such image data, the data processing component can, for example, extract gaze statistics from one or more persons in the viewing environment looking at particular media data being displayed on a display device in the viewing environment. The computer system can map such gaze statistics to corresponding parts of the media data being displayed for a specific amount of time. Yet other data can be mapped to specific parts of media data based on their correspondence to gaze statistics.

As another example, the data processing component can process the image data to identify objects in the viewing environment, from which the computer system can derive additional information about an occurrence of an event. For example, if an object recognition module identifies a birthday cake in an image, the computer system can infer that the event is a birthday.

The context can be used to further annotate collections of media data files and/or individual media data files. Annotation means associating metadata, such as the context information, with other data, such as a media file. Such association occurs by storing the metadata, such as tags, scores, text (natural language), sound, references, etc., in the database or in another format in a manner that associates the metadata with the data. The context can be used to organize a selected set of media data files being presented into a collection and to annotate the collection. The context also can be used to retrieve and present a set of media data files and organize them into a collection, and/or to retrieve and present a previously organized collection of media data files. Such annotations on media data files and collections of media data files can include feedback, reactions and other engagement information determined from the context. By annotating specific media data with information such as feedback and reactions of individuals, the computer system develops an interaction history for the specific media, thus enriching the knowledge by the computer system for the particular media item. The computer system can then use this knowledge to retrieve and present media data for an audience.

The context can be used to associate entities with individual media data files and/or collections of media data files. The context can be used to associate information with individuals and/or groups of individuals, such as implicitly and explicitly identified preferences, viewing patterns, specific locations, events and dates, relationships with other entities.

By processing signals from a viewing environment in various ways to extract context, the computer system, using that context, can dynamically select media data to retrieve and present, can continually organize and annotate media data, and, at the same time, can associate entities with media data, associate other information with entities, and track reactions to the media data from people in the viewing environment, all with minimal or no direction and intervention by the individuals. Such retrieval, presentation and annotation of the media data and entities thus can happen seamlessly. Using such context, the computer system also annotates media data files with additional information and statistics each time the media data files are presented in the viewing environment. The processing of signals from the viewing environment also can provide statistical information about behavioral patterns and implicitly stated preferences for individual users or group of users and families (what media files or stories each user prefers, time-related patterns, session duration, effects and animation applied, etc.).

The computer system can use a set of data structures to organize the metadata for media data files, entities and context from the viewing environment. In particular, a story data structure is a data structure that represents a collection of one or more media data files, associated with one or more entities, such as individuals or group of individuals, and other data based on the context from the viewing environment. The computer system can use the context from the viewing environment to define such a story data structure for a collection of media data files being presented, and/or to select such a story data structure for presentation of its collection of media data files.

A story data structure also can include playback parameter data specifying how the collection of media data files is to be synthesized for presentation. Such playback parameter data can specify, for example, video transitions, audio crossfades, animation, titles, captioning, background music and other effects to be applied to media data when presented. The computer system can dynamically adjust the playback parameter data during presentation based on the context.

The computer system further manages access to the underlying storage of media data, such photos and videos and music and other media data and associated metadata, which are stored in diverse storage systems.

In the following description, reference is made to the accompanying drawings which form a part hereof, and in which are shown, by way of illustration, specific example implementations. Other implementations may be made without departing from the scope of the disclosure.

In the data flow diagrams, a parallelogram indicates data, whereas a rectangle indicates a module of a computer that performs processing on data.

DETAILED DESCRIPTION

A computer system as described herein provides a natural user interface to organize, retrieve, annotate and/or present media data files as collections of media data files associated with one or more entities, such as individuals, groups of individuals or other objects, using context from a viewing environment. Media data files are data files of media data including but not limited to photos, videos and audio and related rich media data, in digital form. The computer system presents media data from selected media data files on presentation devices in the viewing environment and receives and processes signals from sensors in that viewing environment, such as audio signals including verbal communications of individuals in the viewing environment.

Figure 1:
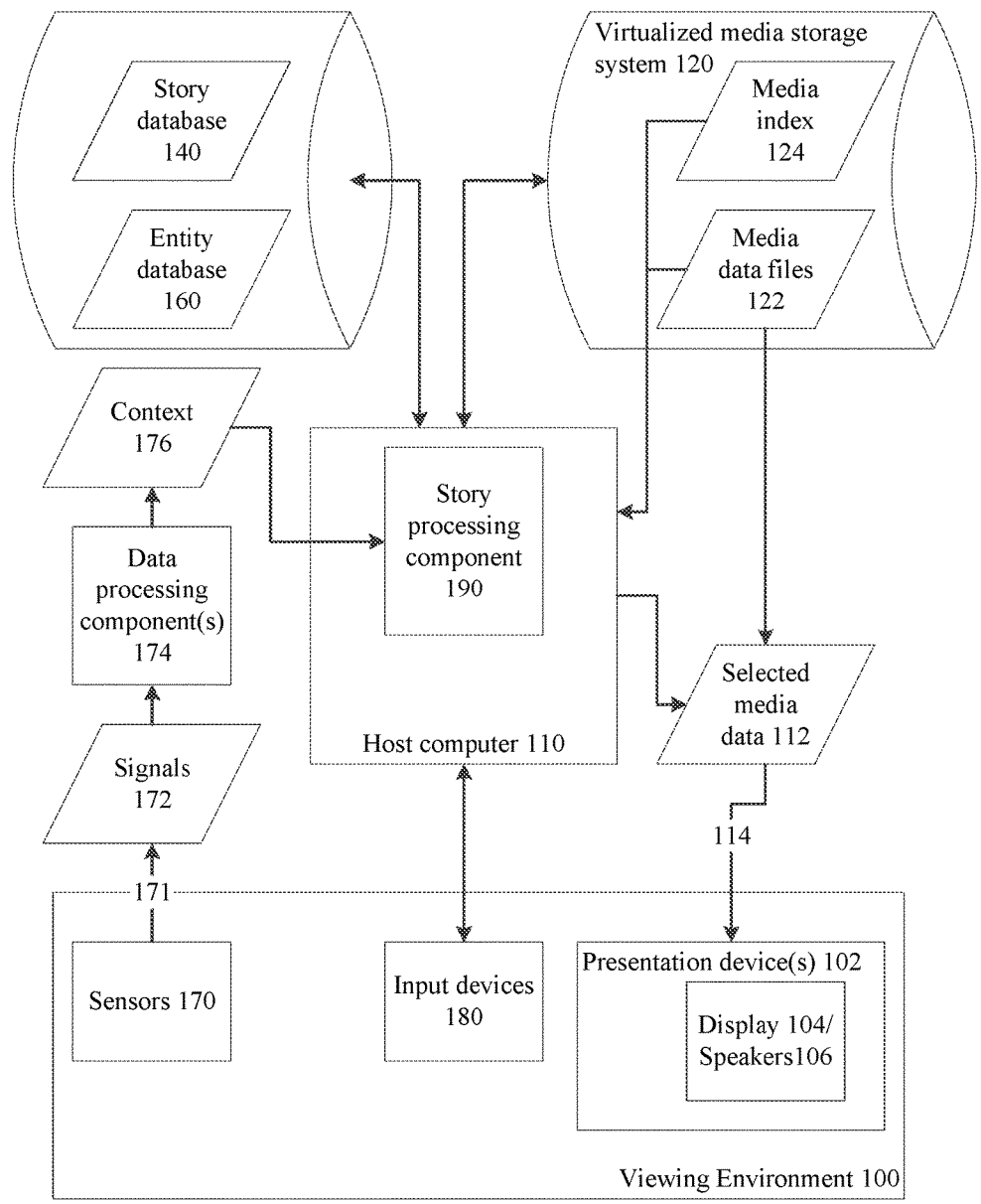
FIG. 1 is a combined block diagram and data flow diagram of a computer system.

Referring to FIG. 1, an illustrative example of a computer system for organization, retrieval, annotation and/or presentation of media data files and entity information will now be described.

In FIG. 1, a viewing environment 100 represents a room or other physical location in which one or more individuals can be present. In general, multiple individuals may be present and interacting with each other in the viewing environment 100. The computer system presents media data in the viewing environment 100 through one or more presentation devices 102. A presentation device can be any device or combination of devices that displays images (e.g., photos or videos or computer generated animation) and/or presents sound (e.g., music, recorded dialog, sound effects).

An example configuration of such a viewing environment is a room, such as in a house, apartment, or other dwelling, which includes one or more displays 104, such as for a television or for a computer or game console, and speakers 106 or integrated media systems. Another example viewing environment is an office, meeting room, conference room or other work space, such as in a place of employment or labor which includes one or more displays. Another example of such a viewing environment is any gathering place for people which includes one or more displays. Another example configuration of such a viewing environment is an individual's personal space in which they use a device, such as a smartphone, with a display 104 and speakers 106.

To present the visual and audio media data on the presentation devices 102, a host computer 110 is configured to cause media data 112 to be transmitted from storage to the presentation devices 102 over a media connection 114. The media connection can be implemented in a number of ways, such as wired (e.g., cable or computer network) or wireless (e.g., WiFi, Bluetooth, cellular, satellite) connections; a computer network (e.g., Ethernet, IP) or computer bus (e.g., USB, HDMI). The media data 112 can be transmitted, for example, as streaming data, analog signals or as one or more data files. The presentation devices 102 can be merely displays and/or speakers, or can be computers or other devices, such as a set top box or game console or smartphone or virtual reality device or augmented reality device, that communicates with the host computer 110 and receives and processes the media data for presentation on the presentation devices 102.

The host computer accesses media data 112 from media data files 122 stored in a virtualized media storage system 120. A virtualized media storage system comprises a media index 124 of the media data files 122. The media index includes, for each file, at least data sufficient to provide the host computer access to where the media data file is actually stored. The media data files 122 may be stored in a large number of possible storage systems, including but not limited to, social media accounts online, cloud-based storage, local device storage, cache layers or other devices such as tablet computers or mobile phones connected to the host computer over a local network, local network attached storage, etc. Generally speaking, social media accounts and cloud-based storage are domains on a computer network which store media data files for users and are accessible using an application, such as a browser application or dedicated application for the domain, running on a client computer. The application accesses files on the domain through user accounts on the domain using usernames and passwords and/or security tokens and/or other methods of authentication and a specified communication protocol for the domain. In some configurations, the virtualized media storage system 120 maintains data to access the media data files from other locations; in other configurations, the virtualized media storage system can maintain local copies of the media data files in local storage. In the latter case, the virtualized media storage system can be configured to periodically synchronize with remote storage systems. Such a virtualized media storage system can provide access to multiple sources of media data transparently to the host computer.

In some configurations, the host computer 110 can read media data from the media data files 122 and then transmit that media data over the media connection 114 to the presentation devices 102. In such a configuration, the host computer can be configured to transform the media data file into a format that can be processed by the presentation devices 102. In some configurations, the host computer 110 can instruct a storage device to transmit media data from a media data file over the media connection 114 to the presentation devices 102. In some configurations, the host computer 110 can instruct a presentation device to request the storage device to transmit the media data from a media data file over the media connection 114 to the presentation device.

The host computer also accesses other data that is used by the computer system to organize, retrieve, annotate and present media data as collections of media data associated with one or more entities. In the example implementation described herein, a story is a data structure stored in computer storage, whether in persistent storage or in memory, that represents a collection of one or more media files, associated with one or more entities, which is annotated based on context from the viewing environment. A story database 140 includes data representing a plurality of stories. An entity database 160 includes data representing a plurality of entities, which can include but are not limited to individuals, groups of individuals and objects, such as but not limited to houses, cars, gardens, cities, roads, monuments, countries, continents, events, landscapes, toys, tools, clothes, flowers, furniture, electronic devices, food, etc.

The data stored in the media index 124, story database 140 and entity database 160 also includes data representing several many-to-many relationships: each story is associated with one or more entities; each story also is associated with one or more media files; each media file is associated with one or more entities; each media file can be associated with one or more stories; an entity, or group of entities, can be associated with one or more stories; an entity can be associated with zero or more groups of entities; a group of entities is associated with one or more entities; an entity or group of entities can be associated with one or more media files. In the foregoing, a particular example of interest of an entity or group of entities is an individual or group of individuals, particularly in their associations to stories, media files and other entities.

The media index, story database and entity database can be implemented using any of a set of storage techniques and data management technologies, such as a relational database, object-oriented database, graph databases, and structured data stored in data files, and the like. Example implementations of these databases are described in more detail below.

The computer system also can include one or more input devices 180 in the environment 100 which provide user inputs to the host computer or other computer in the viewing environment that connects to the host computer. The input devices 180 in combination with the presentation devices 122 can also provide a graphical and mechanical user interface to the host computer 110, or other computer in the viewing environment that connects to the host computer 110. Such an interface can be provided to allow a user to browse, search, select, edit, create, and delete entries or objects in the story database, entity database and media file database, for example.

The computer system also includes one or more sensors 170 in the viewing environment 100. The sensors generate signals 172 in response to physical stimuli from the viewing environment. These signals are input to one or more data processing components 174, which extract data to be provided to the host computer 110 as the context 176 from the viewing environment. The kind of data that can be extracted depends on the nature of the sensor and the kind of data processing components that are used. A data processing component may be implemented as part of the host computer, or as one or more separate computers or devices. The data processing components can perform multiple stages of processing to extract multiple types of data. Data from input devices 180 forming part of a natural user interface to the host computer, such as described below in connection with FIG. 7, also can be used as sensors 170.

To receive the signals from the sensors 170, the signals can be transmitted from the sensors to a data processing component over a sensor connection 171. The sensor connection 171 can be implemented in a number of ways such as a wired (e.g., cable, or computer network) or wireless (e.g., WiFi, Bluetooth) connection; computer network (e.g., Ethernet, IP) or computer bus (e.g., USB, HDMI). Signals from a sensor can be transmitted, for example, as streaming data (for capture by the host computer or data processing component), analog signals (for capture using a peripheral of the data processing component or host computer) or a data file (transmitted to the data processing component or host computer).

An example sensor 170 is a microphone, which generates an audio signal in response to sound waves in the environment 100. Such an audio signal can be an analog or digital signal. The data processing component 174 can process the audio signal, for example, to recognize the verbal descriptions of media being presented to the presentation devices 102 and extract text data. Such text data can be further processed to recognize and extract keywords, entities mentioned such as individuals, locations and other names, time information, sentiment data. The audio signal can also be processed to extract other information, such as the identity of an individual, or characteristics of the individual, such as whether a speaker is a child or an adult, or emotional state of an individual, based on tone of voice, pitch, voice pattern and other audio characteristics of voice. Such information can be correlated with the specific media file or the collection being presented on the presentation devices 102, thus enriching media files with user-generated metadata.

Another example sensor 170 is a conventional camera, which generates image data in response to natural visible light in the environment. The image data can be in the form of an analog video signal, streaming digital video data, one or more image data files, or the like. A camera can generate one or more photos, i.e., still images. A camera can generate a sequence of such still images at a given frame rate to provide video. The camera can include a microphone and combine video and audio data together. Such image data can be processed to recognize individuals present in the viewing environment, detect gaze direction, identify a new user, to capture data describing emotions detected, etc. Such information can be correlated with the specific media file or the collection being presented in the presentation devices 102, thus enriching media files with user-generated metadata.

Another example sensor is a multilens camera, which can include one or more depth cameras, infrared cameras and/or stereoscopic cameras, such as a KINECT sensor available from Microsoft Corporation. Such a system also generates image data, but from a different spectrum of light than a conventional camera for video and photos. Such a sensor can be combined with other data processing component executed by a data conversion device to provide data indicative of gestures of individuals in the environment, gaze direction, and the like.

The inputs from input devices 180 and context extracted from the signals from the sensors 170 are provided to a story processing component 190 on the host computer. The story processing component, in general, implements several operations to organize, retrieve, annotate and present media data files. Such operations are described in more detail below. In general, the story processing component 190 performs operations of using context to select and retrieve media files and/or stories, using context to organize media files into stories, and using context to annotate media files, stories and entities.

More particularly, the context can be used to further annotate collections of media data files and/or individual media data files. The context can be used to organize a selected set of media data files being presented into a collection, called the story, and to annotate the story, or one or more specifics media files, with additional metadata. The context can be used to retrieve and present a set of media data files and organize them into a collection, and/or to retrieve and present a previously organized collection of media data files. The annotations on media data files and collections of media data files can include feedback, reactions, descriptions of the occasion referenced by the media files and other engagement information determined from the context. The context can be used to associate entities with individual media data files and/or collections of media data files as stories. The context can be used to associate entities with each other. The context can be used to associate information with individuals and/or groups of individuals, such as implicitly and explicitly identified preferences, viewing patterns, specific locations, events and dates, relationships with other entities and other metadata.

The computer networks shown in FIG. 1 are merely illustrative. The actual network topology can be any kind of computer network topology. Some of the computers may communicate with each other over a local area network, whereas others may communicate with each other over a wide area network, and the computer network can include a combination of both private networks, including both wired and wireless networks, and publicly-accessible networks, such as the Internet.

Several deployments of such a system are feasible. The following are a few illustrative examples that are not intended to be limiting and also may be used in combination.

For example, the host computer 110 can be a server computer accessible over a computer network. The presentation devices 102 and sensors 170 can be part of a computer, smart phone, smart television, game console, such as the XBOX game console from Microsoft Corporation, tablet computer, augmented reality device, or virtual reality device, such as the HOLOLENS device from Microsoft Corporation, or other wearable computer with sensors, or the like which communicate with the host computer over the computer network.

As another example, the host computer 110 can be a server computer accessible over a computer network. The sensors 170 can be part of a device in the viewing environment which is always on and continually transmitting sensor signals over the computer network to the host computer 110 for processing. The presentation devices 102 can be connected to the host computer 110 through another connection such as over the computer network. The sensors 170 continually transmit signals to the host computer 110 which in response selects and transmits media data to the presentation devices 102 and then captures context to submit and possibly annotate.

As another example, the host computer 110 can be a computer and the data processing components can include multiple server computers that allow remote processing of the signals from sensors 170, and which communicate the context information back to the host computer 110.

As another example, the host computer 110 can be one or more server computers accessible over a computer network, such as the internet, from one or more computers or devices in multiple viewing environments. The host computer can be configured to provide shared storage in which the media data files and other databases are provided for a large number of users with access controls to permit, limit or deny sharing of media data files and other databases among users and collections of users.

Figure 2:
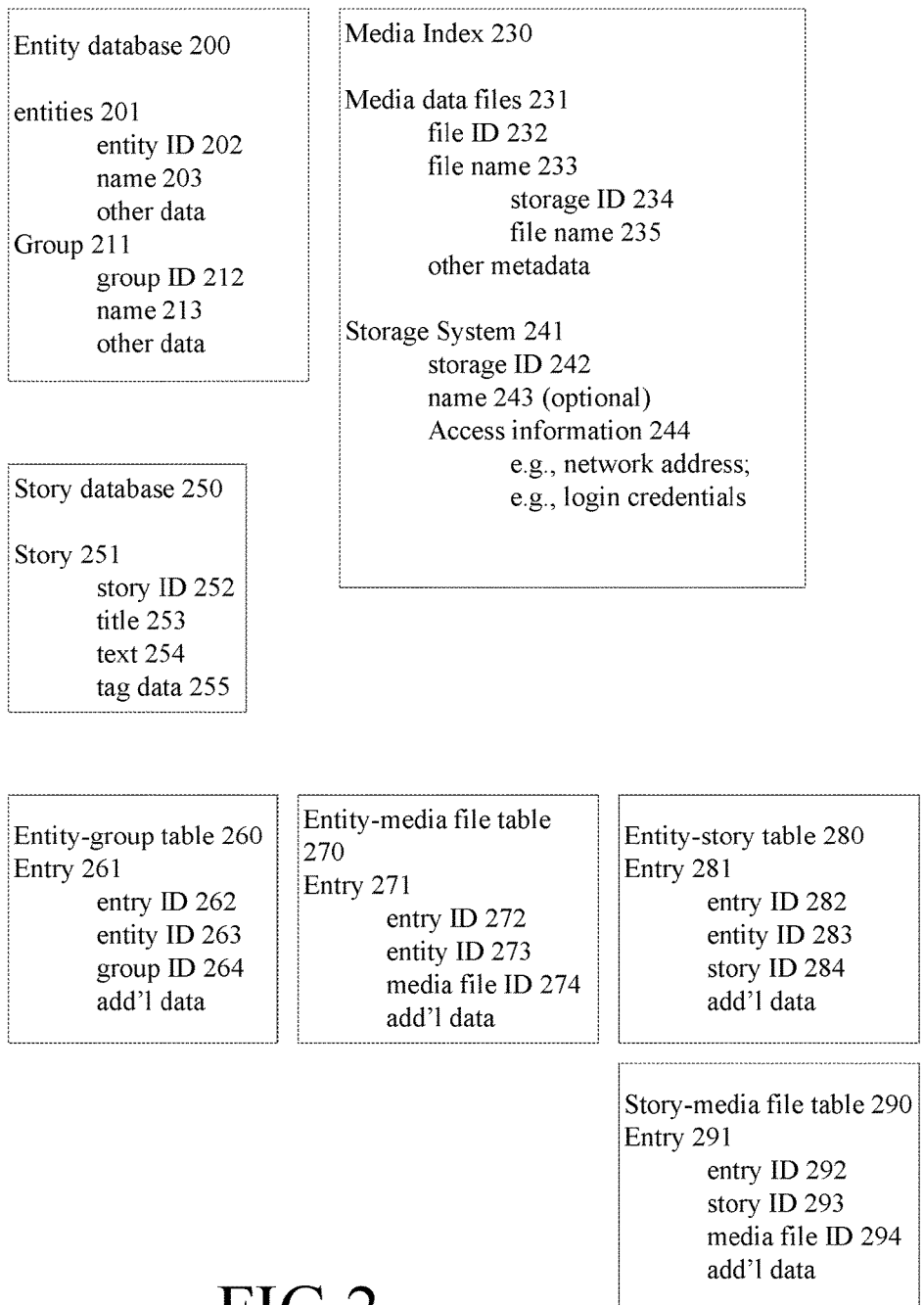
FIG. 2 is a schematic diagram of an example implementation of database schemas.

Turning now to FIG. 2, an example implementation of a media index, entity database and story database will now be described. It should be understood that the following is an illustrative example and not intended to be limiting.

An entity database 200 includes data representing various entities such as individuals and groups of individuals and other objects. An individual can be associated with zero or more groups of individuals. A group of individuals can include one or more individuals, although an actual implementation may permit a user to define an empty group of individuals. Similarly, any entity can be associated with one or more other entities or group of entities.

As shown in FIG. 2, data 201 for an individual, or other singular entity, can include an entity identifier 202 for the entity, and a name 203 for the entity. Examples of other data that can be stored for an individual include, but are not limited to: contact information, location information, demographic information, preferences, entity classification, usage patterns, statistics, scores and the like.

Data 211 for a group of entities such as a group of individuals (e.g., a family or team) can include a group identifier 212 for the group and a name 213 for the group. Examples of other data that can be stored for a group of individuals include, but are not limited to: contact information, location information, group type, group size, access patterns, session histories, classification, group usage patterns, statistics, scores and the like. The data stored for a group of individuals can be aggregated from information stored for each individual in the group. Similar data can be stored for other types of entities.

Data structures that define relationships among entities and groups of entities, and relationships of entities and groups of entities with stories and media data files, are described in more detail below.

A media index 230 includes data representing media data files that are stored in multiple data storage systems, and data representing those storage systems. The multiple data storage systems are accessible from a host computer using the information obtained from the media index.

Data 231 representing a media data file includes a file identifier 232 for the media data file and a file name 233 for the media data file. The file name can include a storage identifier 234 of the data storage system that stores the media data file, and a file name 235 or other identifier for the media data file used by that data storage system to store the file. Examples of other metadata that can be stored for a media data file include, but are not limited to: a title or other text description or label for the media data file; technical data, such as resolution and format information, such as frame rate, raster size, color format, pixel bit depth, file format and the like; time information such as a point in time or range in time at which the media data was captured by a device; location information, such as a geographical location at which the media data was captured by a device; device information, such as an identifier or other information about a device or devices used to capture the media data; tag data, such as keywords or other data to allow structured searching; use information, such as a number of times the media data file has been searched, accessed, shared or liked, or other comments made by users or other analytics, such as gaze analytics; emotional classification; access control information, such as permissions related to access and sharing; uniform resource locators (URLs), uniform resource identifiers (URIs), identification information in the form of identifiers, or globally unique identifiers (GUIDs).

Data 241 representing a data storage system includes a storage identifier 242 for the data storage system, and optionally a name 243, or other description or label, which describes the data storage system. Access information 244 also can be included. The access information 244 can include, for example, but not limited to, a network address through which the host computer can access the data storage system, URLs, URIs, identification information in the form of IDs or GUIDs and authentication information such as a user name and password and/or security tokens for accessing media data files on the data storage system.

Data structures that define relationships of the media data files and/or data storage systems, with entities, groups of entities, and stories, are described in more detail below.

A story database 250 includes data representing stories. Data 251 representing a story includes a story identifier 252 for the story, a title 253, or other text label, for the story, and story text 254. Story text 254 may be a reference to a data file that contains the story text. Examples of other data that can be stored for a story include, but are not limited to: one or more time references, such as a time when the story is created, or when events in the story occurred; one or more location references, such as a location where events in the story occurred, or where the story was created; the identified occasion in reference to the story; tag data 255, such as keywords or other data to allow structured searching and media file classification; usage information, such as a number of times the story was accessed, shared or liked, or other comments made by users; emotional classification; access control information, such as permissions related to access and sharing; media playback preferences, such as specifications for transitions between audio or video files, volume controls, which can be further related to timing for the story; pointers to other stories.

Data structures that define relationships of the stories with entities, groups of entities, and media data files, are described in more detail below.

As noted above, these example data structures can be implemented in a relational database, object oriented database, graph database, structured data stored in data files, and the like, when stored in persistent storage. In some implementations, during processing by the story processing component, similar data structures can be stored in memory for data currently being used by the host computer. Such data structures can be created and filled with data read from the databases, then can be modified and expanded by the story processing component, and then can be persisted into the database for permanent storage.

Some of the data representing stories, entities and media data can involve many-to-many relationships, such as having multiple individuals as part of many groups of individuals, and so on. A number of data tables or files or data structures can be used to represent these many-to-many relationships as several one-to-many relationships. In one example implementation, using a relational database, this data can be represented using a join table. In another example implementation, object-oriented data structures, or an object-oriented database, can represent such relationships directly using different classes to represent different types of relationships and collections of objects. The example shown in FIG. 2 illustrates join tables.

For example, regarding relationships among entities and groups of entities, the entity identifier is a primary key of the entity table, and the group identifier is a primary key of the group table, and a join table can be used to represent the interrelationships. For example, an entity-group table 260 includes entries 261, where each entry has an entry identifier 262 as its primary key, and includes an entity identifier 263 and a group identifier 264 as foreign keys. Such an entry indicates that the entity having the entity identifier 263 is a member of the group having the group identifier 264. To find groups to which a selected entity belongs, or entities belonging in a selected group, this entity-group table 260 can be searched. The entries 261 can include additional fields to store additional data about each relationship, such as when the relationship was stored, the type of relationship between the entity and the group, the role of the entity within the group, and the like. A similar table can be used to track relationships between entities.

Regarding relationships among entities and media data files, the entity identifier is a primary key of the entity table, and the media data file identifier is a primary key of the media index, and a join table can be used to represent their interrelationships. For example, an entity-media file table 270 includes entries 271, where each entry has an entry identifier 272 as its primary key, and includes an entity identifier 273 and a media data file identifier 274 as foreign keys. Such an entry indicates that the entity having the entity identifier 273 is associated with the media data file having the media data file identifier 274. To find media data files associated with a selected entity, or the entities associated with a selected media data file, this entity-media file table 270 can be searched. The entries 271 can include additional fields to store additional data about the relationship between the entity and the media data file, such as whether the entity is an individual that is a creator of the media data file, or whether the entity is present in the media data of the media data file, or the like.

Regarding relationships among entities and stories, the entity identifier is a primary key of the entity table, and the story identifier is a primary key of the story database, and a join table can be used to represent their interrelationships. For example, an entity-story table 280 includes entries 281, where each entry has an entry identifier 282 as its primary key, and includes an entity identifier 283 and a story identifier 284 as foreign keys. Such an entry indicates that the entity having the entity identifier 283 is associated with the story having the story identifier 284. To find stories associated with a selected entity, or the entities associated with a selected story, this entity-story table 280 can be searched. The entries 281 can include additional fields to store additional data about the relationship between the entity and the story, such as whether the entity is an individual that is an author of the story, or whether the entity is present in the media data used in the story, or is mentioned in the story text, or the like.

Regarding relationships among stories and media data files, the story identifier is a primary key of the story database, and the media data file identifier is a primary key of the media index, and a join table can be used to represent their interrelationships. For example, a story-media file table 290 includes entries 291, where each entry has an entry identifier 292 as its primary key, and includes a story identifier 293 and a media data file identifier 294 as foreign keys. Such an entry indicates that the story having the story identifier 293 is associated with the media data file having the media data file identifier 294. To find stories associated with a selected media data file, or the media data files associated with a selected story, this story-media file table 290 can be searched. The entries 291 can include additional fields to store additional data about the relationship between the story and the media data file.

While the example above described join tables in the context of a relational database, in other non-relational database implementations, such data can be stored in the form of files, in-document tags or other data sufficient to represent the relationship.

Given such a computer system such as described in FIG. 1 using a data representation such as described in FIG. 2, there are several ways in which the system can use context from a viewing environment to organize, retrieve, annotate and present media data.

Figure 3:
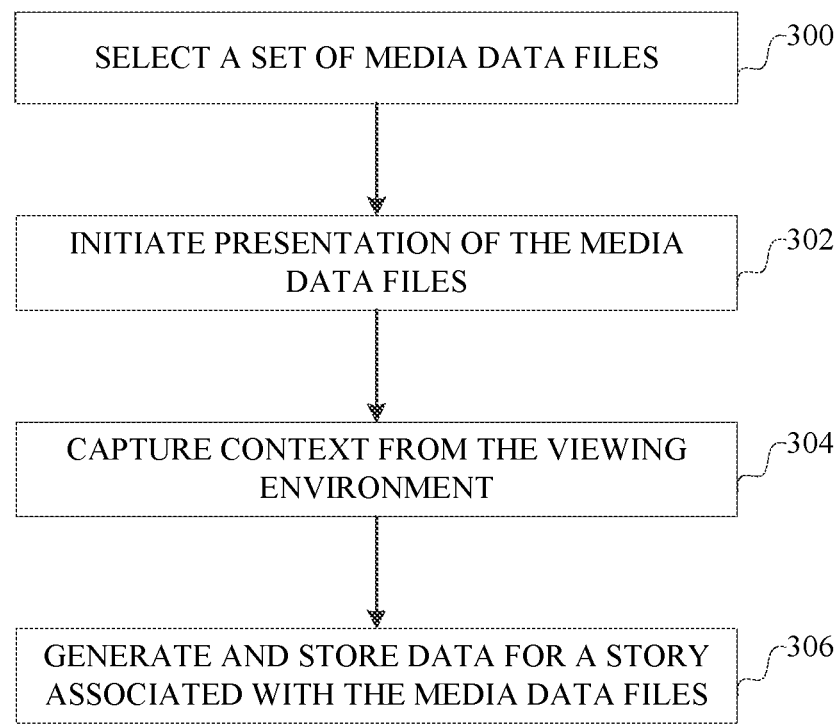
FIG. 3 is a flowchart describing an example implementation of a first mode of operation of the computer system.

Referring now to FIG. 3, a first example of operation of the computer system will now be described.

In this example, a set of media data files is selected 300. Such a selection can arise in a number of ways. For example, the story processing component on the host computer can provide a user interface for the host computer through the sensors, input devices and presentation devices in the environment. Such a user interface can be a graphical user interface, or can be a natural user interface based on voice commands, gestures, gaze analysis and the like. As another example, the story processing component on the host computer can automatically select a set of media data files based on a variety of inputs or criteria or processes. As another example, the story processing component can use the context information from the viewing environment to select a set of media data files.

For example, through the user interface, an end user can browse, search, select, edit, create, and delete entries or objects in the story database, entity database and media file database, with the result of such operations being a set of new, or altered, or selected media data files. As an example, an end user can select all media data files in which one or more entities are present in images. As another example, an end user can select an existing story. As another example, an end user can select media data files captured from a selected geographical location. As another example, a set of media data files may be selected based on a predetermined time period and a set of individuals. As a specific example, all of the media data files created in the last week by an individual or a group of individuals, such as a family, can be identified.

Given a selection of media data files, the host computer initiates presentation 302 of the selected media data files on the presentation devices. The host computer can maintain data structures to store data used in this presentation process, such as any currently presented media data file and time of presentation. There can be multiple media data files presented concurrently. If a particular media data file includes time-based media data, i.e., media data that is a sequence of samples over time, such as video or audio, a current position with the time-based media data also can be tracked by such data structures.

While the selected media files are being presented on the presentation devices, context from the environment is captured 304. As described above, signals based on sensors in the environment are received and subjected to processing by the host computer to derive the context from the signals. The kinds of data extracted from the signals are based on the nature of the signals provided by the sensors and kinds of processing performed on them.

For example, audio signals can be processed to extract text, associated with time information indicating when the text occurred in time, using speech recognition and natural language processing techniques. Extracted text can be further processed to identify or derive information which is relevant to the media presentation such as references to individuals or other entities, sentiment information, time references, occasions, detailed descriptions of the media being presented and the like. The computer system uses such information to annotate the media files or collection being presented with metadata, which thereafter can be used for search and selection logic. When information is also provided by gaze analytics, described below, the computer system can combine the gaze analytics and captured text to more precisely annotate the media data or other data in the system.

As another example, image data from camera devices can be processed to identify individuals in the viewing environment, associated with time information indicating when the individuals were present in the viewing environment, using facial recognition techniques. Image data can also be processed to identify other objects in the viewing environment and also the type of the viewing environment itself, e.g., a room, open space, house, kids party venue, etc., using object recognition techniques.

Image data also can be processed to determine gaze information, which can be further processed to determine, for example, whether a particular individual is looking at the presentation device. Such information can be further processed to generate gaze statistics based on the one or more persons in the viewing environment looking at particular media data being displayed on a display device in the viewing environment. Such gaze statistics can be mapped to corresponding parts of the media data being displayed for a specific amount of time. Yet other data can be mapped to specific parts of media data based on their correspondence to gaze statistics. For example, such statistics might include data indicating that: x % of viewers of an image focused on entity A in the image; or, entity A, out of a total of x entities in an image, captures y % of attention of viewers; or, the right-most part of an image is x times more likely to attract user attention. Such statistics can be used by the story processing component to more effectively select media. For example, the story processing component can select images which, based on gaze statistics, are expected to maximize engagement, interaction and feedback for the specific viewing environment and/or audience.

The host computer processes the context from the viewing environment and the selected media files to generate and store 306 data representing a story in the story database. This step involves populating the data structures in the entity database, story database, and media file database, and associated relationship data structures, based on the data collected, the selected media files, and playback tracking data structures. An example implementation of this process is described in more detail below in connection with FIG. 5.

Figure 4:
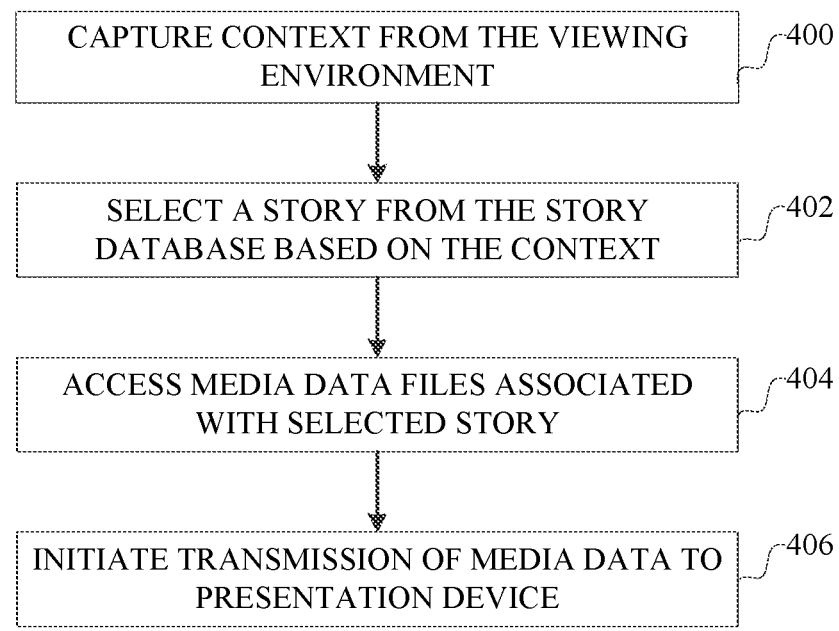
FIG. 4 is a flowchart describing an example implementation of a second mode of operation of the computer system.

Referring now to FIG. 4, a second example of operation of the computer system will now be described.

In this example, the host computer begins operation by capturing 400 context from the viewing environment. Similar to the capturing of context as described in connection with the process in FIG. 3, the context is dependent on the sensors used in the environment and the applications available to process those signals. In addition, the context can be limited to one or more selected types of data, either by an end user or through predetermined settings or programming of the host computer. Such a limitation would be to define how the host computer selects a story.

The story processing component processes the context to select 402 a story from the story database. A story can be selected based on matching any of a number of criteria from the context to the data stored in the databases. For example, a story related to individuals identified or mentioned in the environment and keywords extracted from their conversation can be selected. An example implementation of this process is provided in more detail below in connection with FIG. 6.

The host computer then accesses 404 the media data files associated with the selected story. This access involves using the story-media data file table to identify the media data files associated with the story. The host computer accesses the media index to identify, for each media data file, the data storage system on which the media data file is stored, and a file name for the media data file. The host computer accesses the data storage system information to obtain information to enable access the data storage system for each media data file.

The host computer then initiates transmission 406 of the media data from these media data files for the selected story for presentation on the presentation devices. In this mode of operation, data collected from the environment also can be associated with the selected story using the techniques described above in connection with FIG. 3.

Figure 5:
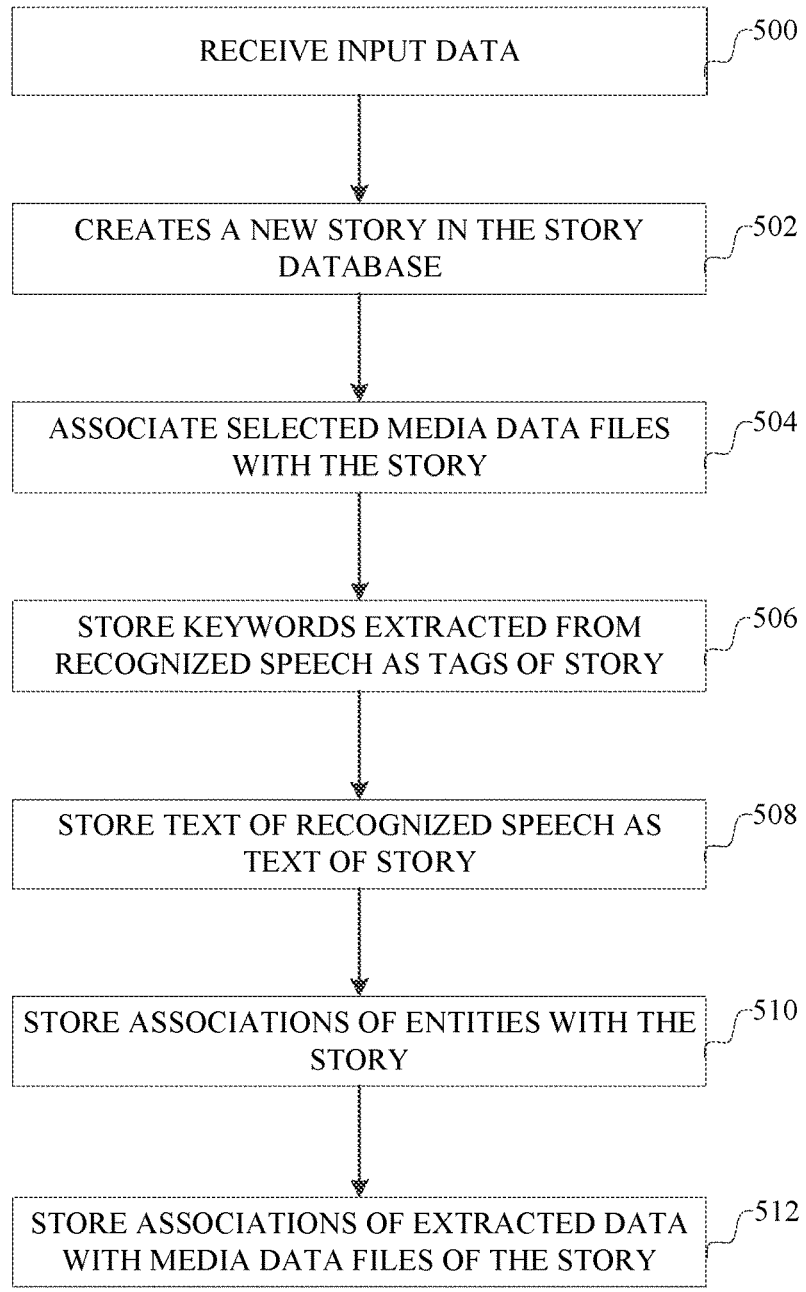
FIG. 5 is a flowchart describing an example implementation of associating data extracted from a sensor with selected media files.

FIG. 5 is a flowchart describing an example implementation of using the context from the viewing environment to package selected media data files into a story.

In this process, the host computer 500 receives as an input, the context from the viewing environment and presentation tracking data. The presentation tracking data is any timing data associated with presentation process that indicates when the selected media data files are presented on the presentation devices. In some cases, the list of media data files and a presentation start time can be sufficient, if the presentation time of each of the media data files can be determined based on the media data files and/or the playback settings.

The host computer creates 502 a new story in the story database, and associates 504 the selected media data files with the new story in the story-media file table. The extracted data is then processed to create further associations in the story database, entity database, media index and associated relationship data. For example, the host computer can store 506 keywords extracted from text based on recognized speech from the environment as the keywords or tags for the story in the story database. The host computer can store 508 a transcript of the recognized speech as the text for the story in the story database. The host computer can store 510 data indicative of the entities, whether an individual or group of individuals, either mentioned in the recognized speech or recognized as present in the environment, as entities associated with the story in the entity-story table. Additionally, time data associated with the collected data can be further processed 512 to associate data with media data files. As an example, speech recognition might provide data indicating that an individual is present in the media data of a particular media data file. Such an association can be recorded in the entity-media file relationship data.

To be clear, the computer system uses two kinds of time references. First, the context has a time reference which corresponds to the time at which the context was captured. Similarly, the presentation tracking information includes a time reference which corresponds to the time at which a media file is presented. The first kind of time reference allows the system to associate particular context with a particular media file. Second, the context can include a time reference. For example, an individual in the viewing environment says "This happened yesterday", and the time reference is "yesterday". The computer system first recognizes the phrase 'yesterday' from the audio signal, and then processes the phrase by converting it to an absolute date in reference to the time it was mentioned in the context. A media file, entity, or story also may include a time reference indicating a time relevant to that data. In particular, media files typically have exact timestamps created on creation. For example, a media file may be marked as captured on a particular day at a particular time, or an event can be marked as having occurred on a particular day. Thus, as an example, if the context derived during presentation of a media file includes the phrase "This happened yesterday", the computer system uses the first time reference to correlate the detected phrase "This happened yesterday" with the currently displayed media data file, by converting 'yesterday' to an absolute date. The computer system then uses the second kind of time reference "yesterday" to annotate that media data file with the exact date determined from processing the statement "yesterday". Such annotation allows the media data file to then be retrieved or organized based on that time reference. Generally speaking, weak time references such as "summer", "winter", "last week", a special holiday, "when John was at University", and the like, can be converted to ranges of dates, including one or more days, weeks, months and/or years.

Figure 6:
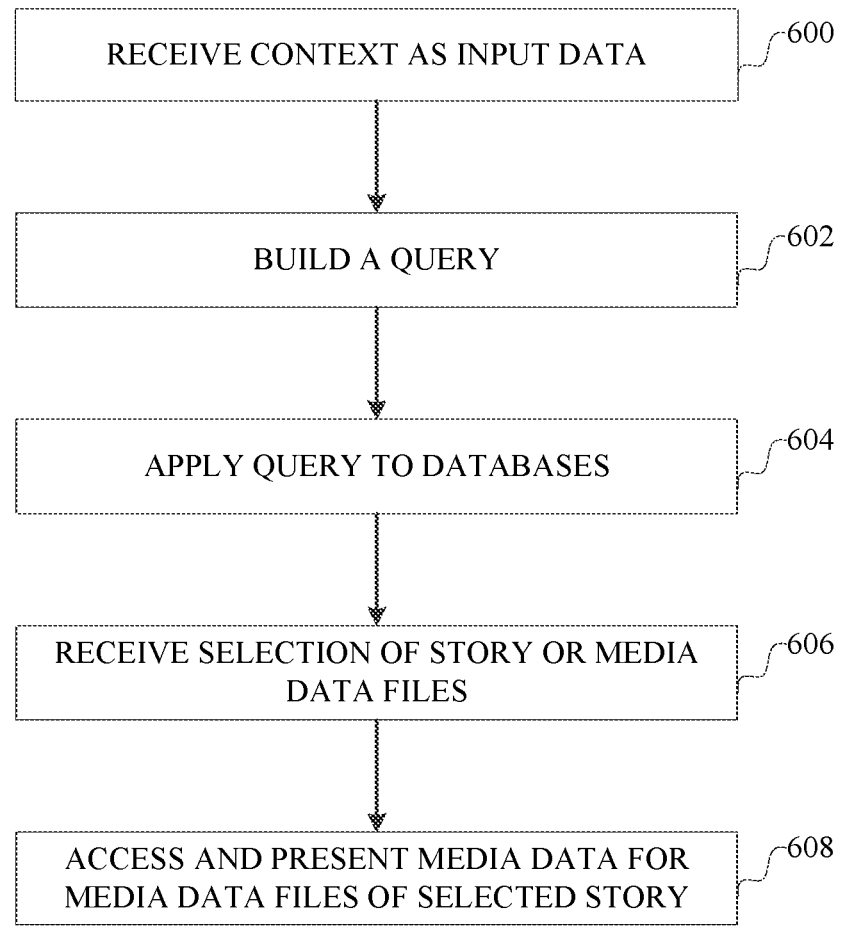
FIG. 6 is a flowchart describing an example implementation of selecting media files using data extracted from a sensor.

FIG. 6 is a flowchart describing an example implementation of selecting media data files using the context.

In this process, the host computer receives 600 as an input the context from the viewing environment, and any further implied or derived selection criteria. The selection criteria can be based on user input, settings in the story processing component on the host computer, and/or predetermined criteria that are part of the story definition and/or metadata.

Based on the received context and the selection criteria, the host computer builds 602 a query for accessing the databases. The form of the query depends on the kinds of data extracted from the sensors and the selection criteria.

The host computer applies 604 the query to the databases and receives results of the query. The results may indicate, for example, one or more stories or a collection of media data files, matching the selection criteria. The host computer can rank the media files or stories using relevance and/or optimization statistics, such as gaze analytics, feedback and reactions captured from previous presentations of each media file, so as to include the more relevant media files and also those with the highest probability to receive high levels of engagement for the viewing environment and/or audience. As part of this ranking and optimization process, specific media files also can be ruled out depending the specific viewing environment and/or audience. From these results, a story or a collection of media data files, for which a story can be created, can be selected 606. The selection can be performed by an end user, based on presentation of the query results to the end user. The selection also can be made automatically by the computer, such as by selecting a story with the best match. The host computer then can access and present 608 the media data files for the selected story.

As used herein, the term "match" is intended to include any form of similarity or difference metric applied between a set of input terms, such as query terms, and a set of features associated with one or more entries in the stored data. While the examples above describe matching metadata from the context to stories, any portion of the context derived from the viewing environment can be processed into a set of terms that can be compared to entries in the database to retrieve items from the database using any of a variety of similarity, difference or exact matching techniques.

Such a computer system can support a wide variety of use cases in which context from the viewing environment can be used to organize, retrieve, annotate and/or present media data files as collections of media data files associated with one or more entities, such as individuals, groups of individuals or other objects.

For example, the context can include audio signals including verbal communications of individuals in the viewing environment, such as a conversation among individuals in the viewing environment and occurring naturally and possibly independently from the viewing experience, which is then processed by the computer system to generate a media experience that accompanies the conversation.

For example, if the viewing environment is in a home of a family, the continually processed context can be used to intelligently serve, and continually annotate media data from, various media experiences, resulting in a system that adapts over time in how it presents media experiences tailored to individuals in the viewing environment. The context can be used to identify family and individual viewing patterns, significant dates, occasions, events and objects, and expressions (faces, verbal language elements, gestures), and associate these with various tags or scores, and then annotate media files and other data with these tags or scores. The annotated media files and other data allow the system to retrieve and present media data based on insights about the individuals and the family and individuals currently identified in the viewing environment. For example, words and phrases commonly used by some family members, or from a memorable moment, can be used to annotate the media data and then used as search entry points to retrieve that media data. These words and phrases may be obtained from the context or the media data or a combination of both, such as a voice command received during presentation of the media data.

As another example, the computer system can process audio signals from an individual in the viewing environment, and gaze and positioning information of the individual relative to a display. The gaze and positioning information can be used to determine if any words, phrases or story extracted from the audio signal may be relevant to media data being presented in the viewing environment. Using the gaze analytics, the computer system determines if the individual is talking about the presented media, using both natural language processing and also the information if the user is looking at on the presented media, and if so, which specific entity and/or area of the presented media. If it is so determined that the individual is talking about the presented media, then the computer system further process the extracted words, phrases or more text such as a description or story, and annotates the presented media data file in the databases with this information.

As another example, audio data, such as music, recorded sound, representations of melodies and the like, or other music data, such as lyrics, mood class, instrumentation or other properties, can be searchable metadata associated with a story, a collection of media data files, or individual media data files, or entities in the database. The computer system can be configured to, for example in response to a voice command, process audio data (such as a whistled or hummed tune) to extract information to either search the database or annotate entries in the database. For example, music of a particular mood class can be associated with a story in the database. As another example, music of a particular mood class can be associated with a specific class of events, such as a birthday celebration or Christmas celebration. The stories or media files can then be retrieved by receiving a specific whistle or hummed tune or song or melody which is associated with entities, stories or isolated media files.

As another example, using file sharing techniques in a shared storage system, stories, media file and/or entity information from the various databases can be shared with other users, such as an "extended family". The entity database can be used to track different collections of individuals as different "families" or "extended families" to enable such sharing.

As another example, natural language processing applied to audio signals from the viewing environment can be used in many ways. Given words, phrases and other information extracted from the audio signal, the databases can be searchable by any individual with sufficient privileges. A user can thus 'ask' the computer system for stories in many ways, both explicitly and implicitly. For example, a user can ask for photos of persons x, y, and z, a few years ago and/or in certain locations and/or in certain circumstances and/or with certain emotion tags, phrases. The computer system can then identify matching stories and/or media files, rank them, define presentation and display properties, and begin presenting the media files to the user. Natural language processing can be used, for example, to provide subtitles, comments and further annotations. The viewers' reactions to the presented media files can then be captured from the context of the viewing environment and used to further annotate the selected and presented media files and stories. For example, rating information, such as "like" or "don't like" or a value on a numerical scale, can also be provided, for example through a voice command and/or gesture. As another example, reactions of individuals can be implied through processing other context information, such as facial analysis, sounds and body movement. This information can be used to associate a media data file with an individual and the provided reaction or rating.

As another example, the computer system can provide some editing functionality in response to voice input and commands. For example, in response to a voice command, e.g., "annotate", a currently presented media data file can be annotated with keywords, subtitles, emotion labels, titles or other information. As another example, in response to a voice command, e.g., "edit", a media data file or story can be presented for editing by the user.

A wide variety of other uses can be provided by such a computer system that is configured to use context from the viewing environment to organize, retrieve, annotate and/or present media data files as collections of media data files associated with one or more entities, such as individuals, groups of individuals or other objects.

Figure 7:
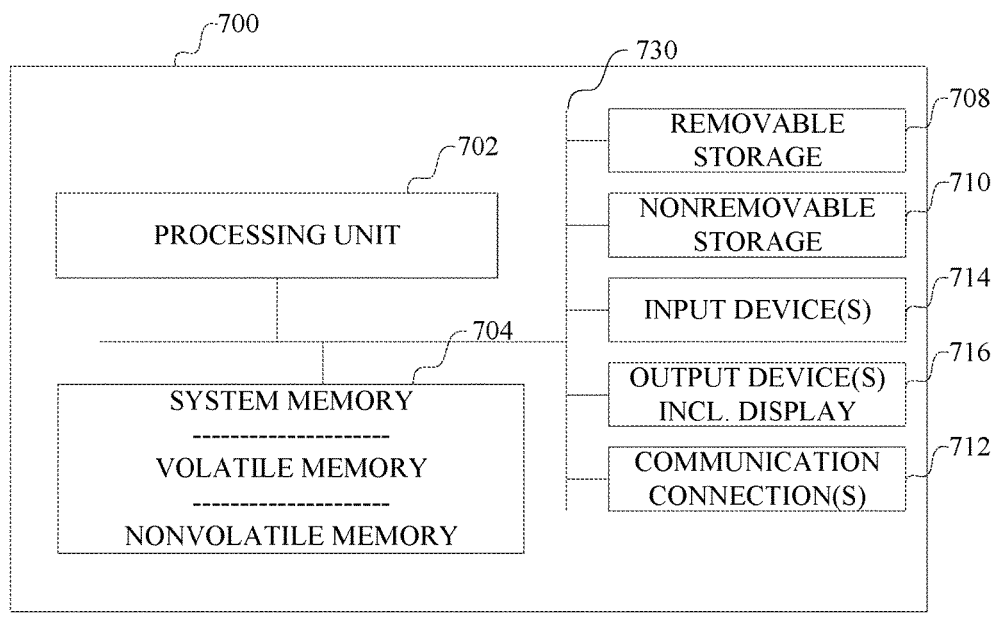
FIG. 7 is a block diagram of an example general purpose computer.

Having now described an example implementation, FIG. 7 illustrates an example of a computer with which components of the computer system of the foregoing description can be implemented. This is only one example of a computer and is not intended to suggest any limitation as to the scope of use or functionality of such a computer.

The computer can be any of a variety of general purpose or special purpose computing hardware configurations. Some examples of types of computers that can be used include, but are not limited to, personal computers, game consoles, set top boxes, hand-held or laptop devices (for example, media players, notebook computers, tablet computers, cellular phones, personal data assistants, voice recorders), virtual reality and augmented reality devices, server computers, multiprocessor systems, microprocessor-based systems, programmable consumer electronics, networked personal computers, minicomputers, mainframe computers, and distributed computing environments that include any of the above types of computers or devices, and the like.

With reference to FIG. 7, a computer 700 includes at least one processing unit 702 and memory 704. The computer can have multiple processing units 702 and multiple devices implementing the memory 704. A processing unit 702 can include one or more processing cores (not shown) that operate independently of each other. Additional co-processing units also can be present in the computer. The memory 704 may include volatile devices (such as dynamic random access memory (DRAM) or other random access memory device), and nonvolatile devices (such as a read-only memory, flash memory, and the like) or some combination of the two. Other storage, such as dedicated memory or registers, also can be present in the one or more processors. The computer 700 can include additional storage, such as storage devices (whether removable or non-removable) including, but not limited to, magnetically-recorded or optically-recorded disks or tape. Such additional storage is illustrated in FIG. 7 by removable storage device 708 and non-removable storage device 710. The various components in FIG. 7 are generally interconnected by an interconnection mechanism, such as one or more buses 730.

A computer storage medium is any medium in which data can be stored in and retrieved from addressable physical storage locations by the computer. Computer storage media includes volatile and nonvolatile memory, and removable and non-removable storage devices. Memory 704, removable storage 708 and non-removable storage 710 are all examples of computer storage media. Some examples of computer storage media are RAM, ROM, EEPROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

Computer 700 may also include communications connection(s) 712 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal, thereby changing the configuration or state of the receiving device of the signal. By way of example, and not limitation, communication media includes wired media, such as metal or other electrically conductive wire that propagates electrical signals or optical fibers that propagate optical signals, and wireless media, such as any non-wired communication media that allows propagation of signals, such as acoustic, electromagnetic, electrical, optical, infrared, radio frequency and other signals. Communications connections 712 are devices such as a wired network interface, wireless network interface, radio frequency transceiver, e.g., Wi-Fi, cellular, long term evolution (LTE) or Bluetooth, etc., transceivers, navigation transceivers, e.g., global positioning system (GPS) or Global Navigation Satellite System (GLONASS), etc., transceivers, that interface with the communication media to transmit data over and receive data from communication media.

The computer 700 may have various input device(s) 714 such as a pointer device, keyboard, touch-based input device, pen, camera, microphone, sensors, such as accelerometers, thermometers, light sensors and the like, and so on. The computer 700 may have various output device(s) 716 such as a display, speakers, and so on. Such devices are well known in the art and need not be discussed at length here. Various input and output devices can implement a natural user interface (NUI), which is any interface technology that enables a user to interact with a device in a "natural" manner, free from artificial constraints imposed by input devices such as mice, keyboards, remote controls, and the like.

Examples of NUI methods include those relying on speech recognition, touch and stylus recognition, gesture recognition both on screen and adjacent to the screen, air gestures, head and eye tracking, voice and speech, vision, touch, gestures, and machine intelligence, and may include the use of touch sensitive displays, voice and speech recognition, intention and goal understanding, motion gesture detection using depth cameras (such as stereoscopic camera systems, infrared camera systems, and other camera systems and combinations of these), motion gesture detection using accelerometers or gyroscopes, facial recognition, three dimensional displays, head, eye, and gaze tracking, immersive augmented reality and virtual reality systems, all of which provide a more natural interface, as well as technologies for sensing brain activity using electric field sensing electrodes (EEG and related methods).

The various storage 710, communication connections 712, output devices 716 and input devices 714 can be integrated within a housing with the rest of the computer, or can be connected through various input/output interface devices on the computer, in which case the reference numbers 710, 712, 714 and 716 can indicate either the interface for connection to a device or the device itself as the case may be.

A computer generally includes an operating system, which is a computer program that manages access to the various resources of the computer by applications. There may be multiple applications. The various resources include the memory, storage, input devices and output devices, such as display devices and input devices as shown in FIG. 7.

The various modules, components, data structures and processes of FIGS. 1-6, as well as any operating system, file system and applications on a computer in FIG. 7, can be implemented using one or more processing units of one or more computers with one or more computer programs processed by the one or more processing units. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct or configure the computer to perform operations on data, or configure the computer to implement various components, modules or data structures.

Alternatively, or in addition, the functionality of one or more of the various components described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Accordingly, in one aspect, a computer system includes computer-accessible storage configured to store entity data including data identifying a plurality of entities and data identifying relationships among the entities, media data files and media file metadata, wherein each media data file has associated media file metadata, the metadata including an indication of one or more entities associated with the media data file, and text data, and story data including a plurality of stories, each story including at least text data, an indication of a plurality of the entities associated with the story and an indication of a plurality of media data files associated with the story. The computer system also includes a sensor in an environment, the sensor generating a signal representing at least verbal communication by an individual in the environment. The computer system also includes a presentation device in the environment configured to receive media data and process the media data to present the media data in the environment. The computer system also includes a processing system configured to receive the signal from the sensor, process the signal to derive context, the context including at least data extracted from the received signal representing the verbal communication by the individual in the environment and data indicating an entity. The processing system is further configured to present media data from a selection of media data files on the presentation device in the environment while receiving the signal from the sensor, and annotate a media data file among the selection of media data files based at least on the context derived from the signal from the sensor.

In another aspect, an article of manufacture includes a computer storage medium and computer program instructions stored on the computer storage medium, that when executed by a host computer configure the host computer to provide a computer system that includes computer-accessible storage configured to store entity data including data identifying a plurality of entities and data identifying relationships among the entities, media data files and media file metadata, wherein each media data file has associated media file metadata, the metadata including an indication of one or more entities associated with the media data file, and text data, and story data including a plurality of stories, each story including at least text data, an indication of a plurality of the entities associated with the story and an indication of a plurality of media data files associated with the story. The computer program instructions further configure the host computer to receive a signal from a sensor in an environment, the sensor generating a signal representing at least verbal communication by an individual in the environment, and to process the signal to derive context, the context including at least data extracted from the received signal representing the verbal communication by the individual in the environment and data indicating an entity, and to present media data from a selection of media data files on a presentation device in the environment while receiving the signal from the sensor, and to annotate a media data file among the selection of media data files based at least on the context derived from the signal from the sensor.

In another aspect, a computer-implemented process uses a computer system including computer-accessible storage configured to store entity data including data identifying a plurality of entities and data identifying collections of entities from the plurality of entities, media data files and media file metadata, wherein each media data file has associated media file metadata, the metadata including an indication of one or more entities of the plurality of entities associated with the media data file, and text data, and story data including a plurality of stories, each story including at least text data, an indication of a plurality of the entities associated with the story and an indication of a plurality of media data files associated with the story. The computer-implemented process includes receiving a signal from a sensor in an environment, the sensor generating a signal representing at least verbal communication by an individual in the environment, processing the signal to derive context, the context including at least data extracted from the received signal representing the verbal communication by the individual in the environment and data indicating an entity, presenting media data from a selection of media data files on the presentation device in the environment while receiving the signal from the sensor, and annotating a media data file among the selection of media data files based at least on the context derived from the signal from the sensor.

In another aspect, a computer system includes means for processing signals received from sensors in a viewing environment during presentation of media data on presentation devices in the viewing environment to extract context from the signals, and means for further processing media data using the extracted context.

In another aspect, a computer-implemented process includes processing signals received from sensors in a viewing environment during presentation of media data on presentation devices in the viewing environment to extract context from the signals, and further processing media data using the extracted context.

In any of the foregoing aspects, presented media data can be selected based on the context and/or presented media data can be annotated based on the context.

In any of the foregoing aspects, the selection of the media data files can be generated by matching the derived context to metadata associated with media data files in the storage.

In any of the foregoing aspects, a media data file can be annotated by defining a story associated with the selection of media data files, and annotating the defined story based at least on the derived context.

In any of the foregoing aspects, the selection of the media data files can be generated by matching the derived context to metadata associated with stories in the storage, and selecting at least one matching story, and accessing a collection of media data files associated with the selected story as the selection of media data files to be presented.

In any of the foregoing aspects, a computer can further be configured to receive an input indicating the selection of the media data files, initiate the presentation of the selection of the media files, associate a story with the selection of the media data files, and associate the context with the story associated with the selected media data files.

In any of the foregoing aspects, the media data files can be stored on a plurality of data storage systems, wherein the metadata for media data files further includes data indicating data storage systems on which the media data files are stored, and the computer-accessible storage is further configured to store data storage system data including, for each data storage system, data enabling the computer to access the data storage system. The data storage systems can include domains on a computer network which store media data files for users accessible using a browser application through user accounts using usernames and passwords.

In any of the foregoing aspects, the computer-accessible storage can be configured as a database including an entity database including data about entities, a story database including data about stories, a media index including data about media data files, and a plurality of relationship data structures specifying the associations among the entities, the stories and the media data files.

In any of the foregoing aspects, a computer can be further configured to associate a time reference with the derived context, and associate the context with a media data file based at least on a time reference associated with media data from the media data file and the time reference associated with the derived context.

Any of the foregoing aspects may be embodied as a computer system, as any individual component of such a computer system, as a process performed by such a computer system or any individual component of such a computer system, or as an article of manufacture including computer storage in which computer program instructions are stored and which, when processed by one or more computers, configure the one or more computers to provide such a computer system or any individual component of such a computer system.

It should be understood that the subject matter defined in the appended claims is not necessarily limited to the specific implementations described above. The specific implementations described above are disclosed as examples only.

What is claimed is:
1. A computer system comprising:
a. computer-accessible storage configured to store:
   entity data comprising a first data structure storing data identifying a plurality of entities and data identifying relationships among the entities;
   media data files and media file metadata, wherein each media data file has associated media file metadata, the metadata comprising a second data structure storing: an indication of one or more entities associated with the media data file, and text data; and
   story data comprising a third data structure storing data representing a plurality of stories, each story comprising at least text data, an indication of a plurality of the entities associated with the story and an indication of a plurality of media data files associated with the story;
b. a sensor in an environment, the sensor generating a signal representing at least verbal communication by an individual in the environment;
c. a presentation device in the environment configured to receive media data and process the media data to present the media data in the environment; and
d. a processing system configured to:
   receive the signal from the sensor;
   process the signal to derive context, the context including at least data extracted from the received signal representing the verbal communication by the individual in the environment and data indicating an entity;
   present media data from a selection of media data files on the presentation device in the environment while receiving the signal from the sensor;
   annotate a media data file among the selection of media data files based at least on the context derived from the signal from the sensor.

2. The computer system of claim 1 wherein the processing system is further configured to:
   generate the selection of the media data files by matching the derived context to metadata associated with media data files in the storage.

3. The computer system of claim 2, wherein to annotate a media data file comprises:
   define a story associated with the selection of media data files;
   annotate the defined story based at least on the derived context.

4. The computer system of claim 1 wherein the processing system is further configured to:
   generate the selection of the media data files by matching the derived context to metadata associated with stories in the storage; and
   select at least one matching story; and
   access a collection of media data files associated with the selected story as the selection of media data files to be presented.

5. The computer system of claim 1 wherein the processing system is further configured to:
   receive an input indicating the selection of the media data files;
   initiate the presentation of the selection of the media files;
   associate a story with the selection of the media data files; and
   associate the extracted text data and entity data with the story associated with the selected media data files.

6. The computer system of claim 1, wherein the media data files are stored on a plurality of data storage systems, and wherein the metadata for media data files further comprises data indicating data storage systems on which the media data files are stored, and wherein the computer-accessible storage is further configured to store data storage system data comprising, for each data storage system, data enabling the computer to access the data storage system.

7. The computer system of claim 6, wherein the data storage systems include domains on a computer network which store media data files for users, and which are accessed through user accounts using usernames and passwords.

8. The computer system of claim 1, wherein the computer-accessible storage is configured as a database comprising:
   an entity database comprising data about entities;
   a story database comprising data about stories;
   a media index comprising data about media data files; and
   a plurality of relationship data structures specifying the associations among the entities, the stories and the media data files.

9. The computer system of claim 1, further comprising:
   associating a time reference with the derived context;
   associating the context with a media data file based at least on a time reference associated with media data from the media data file and the time reference associated with the derived context.

10. An article of manufacture, comprising:
   a computer storage medium;
   computer program instructions stored on the computer storage medium, that when executed by a host computer configure the host computer to provide a computer system comprising:
   a. computer-accessible storage configured to store:
      entity data comprising a first data structure storing data identifying a plurality of entities and data identifying relationships among the entities;
      media data files and media file metadata, wherein each media data file has associated media file metadata, the metadata comprising a second data structure storing: an indication of one or more entities associated with the media data file, and text data; and
      story data comprising a third data structure storing data representing a plurality of stories, each story comprising at least text data, an indication of a plurality of the entities associated with the story and an indication of a plurality of media data files associated with the story; and
   b. a processing system configured to:
      receive the signal from a sensor in an environment, the sensor generating a signal representing at least verbal communication by an individual in the environment;
      process the signal to derive context, the context including at least data extracted from the received signal representing the verbal communication by the individual in the environment and data indicating an entity;
      present media data from a selection of media data files on a presentation device in the environment while receiving the signal from the sensor;
      annotate a media data file among the selection of media data files based at least on the context derived from the signal from the sensor.

11. The article of manufacture of claim 10 wherein the processing system is further configured to generate the selection of the media data files by matching the derived context to metadata associated with media data files in the storage.

12. The article of manufacture of claim 11 wherein to annotate a media data file comprises:
   define a story associated with the selection of media data files; and
   annotate the defined story based at least on the derived context.

13. The article of manufacture of claim 10, wherein the processing system is further configured to:
   generate the selection of the media data files by matching the derived context to metadata associated with stories in the storage; and
   select at least one matching story; and
   access a collection of media data files associated with the selected story as the selection of media data files to be presented.

14. The article of manufacture of claim 10, wherein the processing system is further configured to:
   receive an input indicating the selection of the media data files;
   initiate the presentation of the selection of the media files;
   associate a story with the selection of the media data files; and
   associate the extracted text data and entity data with the story associated with the selected media data files.

15. The article of manufacture of claim 10, wherein the media data files are stored on a plurality of data storage systems, and wherein the metadata for media data files further comprises data indicating data storage systems on which the media data files are stored, and wherein the computer-accessible storage is further configured to store data storage system data comprising, for each data storage system, data enabling the computer to access the data storage system.

16. The article of manufacture of claim 15, wherein the data storage systems include domains on a computer network which store media data files for users, and which are accessed through user accounts using usernames and passwords.

17. The article of manufacture of claim 10, wherein the computer-accessible storage is configured to store a database comprising:
   an entity database comprising data about entities;
   a story database comprising data about stories;
   a media index comprising data about media data files; and
   a plurality of relationship data structures specifying the associations among the entities, the stories and the media data files.

18. The article of manufacture of claim 10, further comprising:
   determining a first time reference corresponding to time of occurrence of the derived context;
   based on a second time reference associated with presentation of media data from a media data file, associating the derived context with media data from a media data file having a second time reference matching the first time reference.

19. A computer-implemented process using a computer system comprising computer-accessible storage configured to store: entity data comprising a first data structure storing data identifying a plurality of entities and data identifying collections of entities from the plurality of entities; media data files and media file metadata, wherein each media data file has associated media file metadata, the metadata comprising a second data structure storing an indication of one or more entities of the plurality of entities associated with the media data file, and text data; and story data comprising a third data structure storing data representing a plurality of stories, each story comprising at least text data, an indication of a plurality of the entities associated with the story and an indication of a plurality of media data files associated with the story; and a sensor in an environment, the sensor generating a signal representing at least verbal communication by an individual in the environment; and a presentation device in the environment configured to receive media data and process the media data to present the media data in the environment, the computer-implemented process, performed by the computer system, comprising:
- receiving the signal from the sensor;
- processing the signal to derive context, the context including at least data extracted from the received signal representing the verbal communication by the individual in the environment and data indicating an entity;
- presenting media data from a selection of media data files on the presentation device in the environment while receiving the signal from the sensor;
- annotating a media data file among the selection of media data files based at least on the context derived from the signal from the sensor.

20. The process of claim 19, further comprising:
- generating the selection of the media data files by matching the derived context to metadata associated with media data files in the storage.

* * * * *